Figure 1:
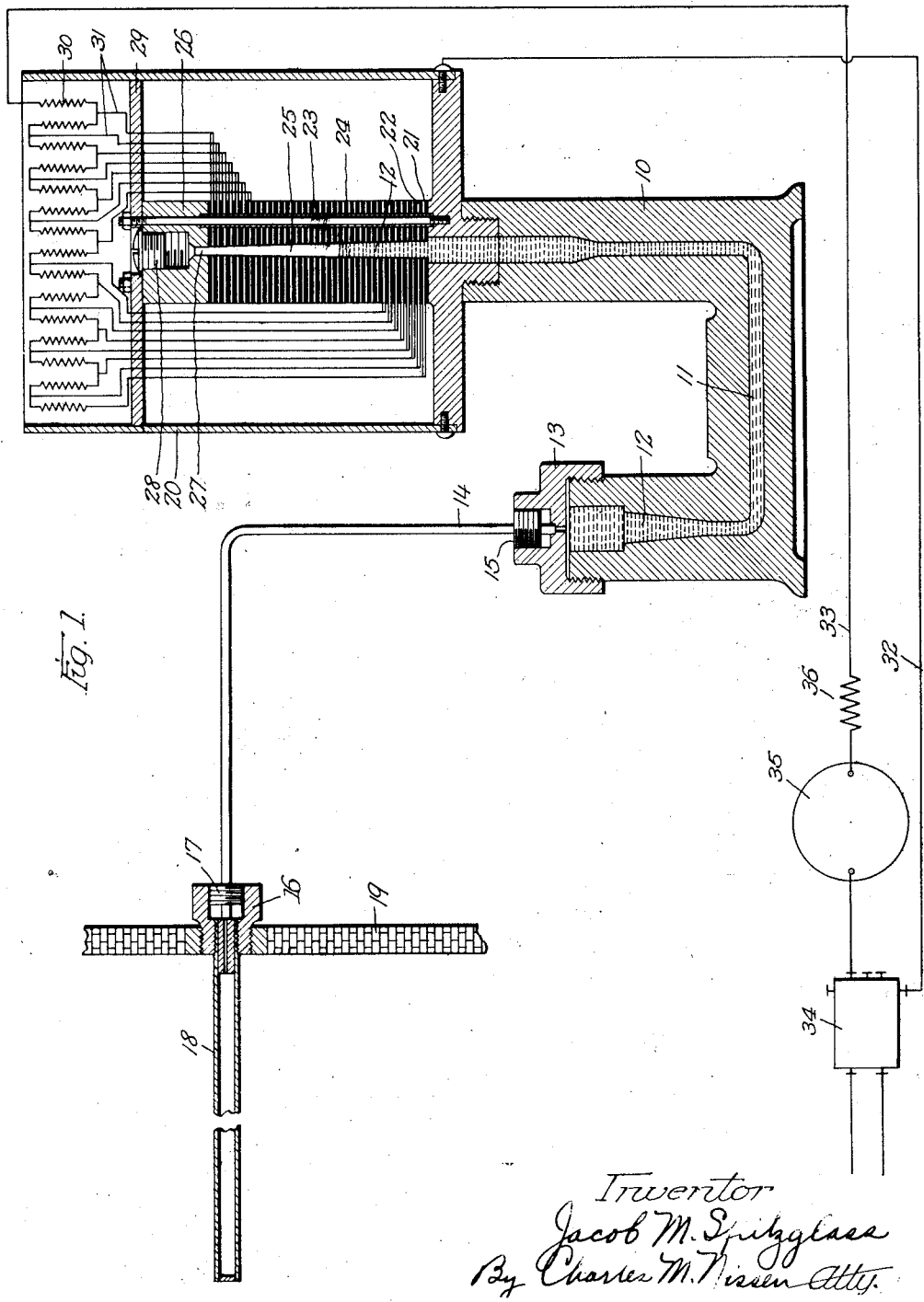

Oct. 5, 1926.

J. M. SPITZGLASS 1,601,744

THERMOMETER

Filed March 15, 1920     2 Sheets-Sheet 1

Inventor
Jacob M. Spitzglass
By Charles M. Nissen Atty.

Oct. 5, 1926.
J. M. SPITZGLASS
THERMOMETER
Filed March 15, 1920 2 Sheets-Sheet 2
1,601,744
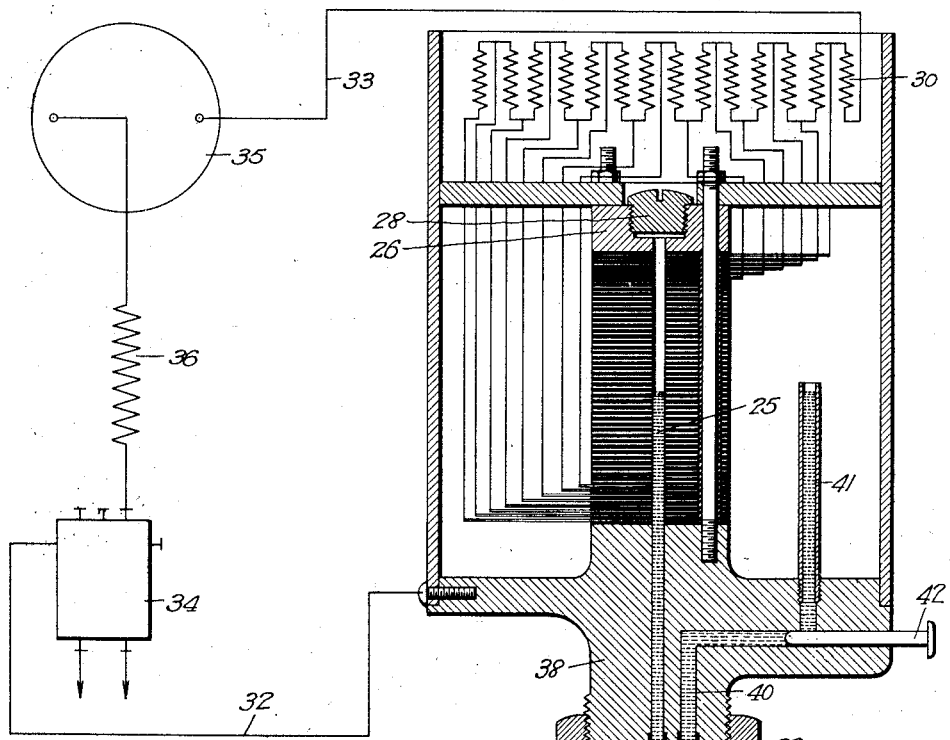
Fig. 2.
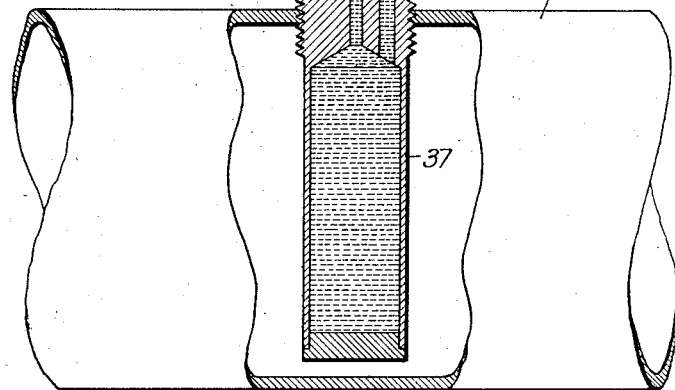
Inventor
Jacob M. Spitzglass
By Charles M. Nissen Atty.

Patented Oct. 5, 1926.

1,601,744

UNITED STATES PATENT OFFICE.

JACOB M. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS.

THERMOMETER.

Application filed March 15, 1920. Serial No. 366,084.

This invention has for its object the provision of a thermometer of improved construction and operation, which may be used to indicate temperatures at a distance from the point at which the temperature is measured.

The invention is exemplified in the combination and arrangement of parts shown in the accompanying drawings and described in the following specification, and it is more particularly pointed out in the appended claim.

In the drawings—

Fig. 1 is a vertical sectional view, somewhat diagrammatic in character, of a device embodying one form of the present invention; and Fig. 2 is a similar view of a modified form of the invention.

In the form of the invention shown in Fig. 1, the numeral 10 designates a stand or casting provided with a U-shaped opening 11, in which mercury 12 or other liquid is contained. One arm of the stand 10 is provided with a cap 13 to which a connecting tube 14 is secured by a stuffing box 15. The interior of the tube 14 communicates with the U-tube 11 of the stand 10. The tube 14 is connected by a bushing 16 and stuffing box 17 with a tube or container 18 situated within the chamber in which the temperature is to be measured. One wall only of the chamber is shown in the drawings and is designated by the numeral 19.

The other arm of the stand 10 connects with the interior of a casing 20 having a plurality of metal discs 21 arranged therein to alternate with discs of insulating material 22 which may be fiber or other substance. The discs 21 and 22 are held in place by a plurality of rods 23 surrounded by insulating sleeves 24. The discs are all centrally bored to provide a continuous opening 25 communicating with the arm of the U-tube 11. A block 26 rests upon the uppermost insulating disc and is provided with an opening 27 communicating with the opening 25. The opening in the block 26 may be closed by a screw plug 28, but the closure should not be air-tight, but should permit passage of air into and out of the opening 25. A platform disc 29 is secured to the upper face of the blocks 26 by the bolts 23, and a plurality of resistance coils 30 are arranged in the space above the platform 29. The coils 30 are connected in series and conductors 31 are connected with the circuit between each pair of coils. Each of the conductors 31 is connected with one of the metallic discs 21, which form the column surrounding the opening 25. The circuit including the resistance coils 30 is connected by line wires 32 and 33 with a suitable source of substantially constant electro-motive force, such as a transformer 34, and the circuit includes a recording ammeter 35 and preferably an external resistance 36.

It will be apparent that an increase in temperature within the chamber 19 will cause the air in the tube 18 to expand, shifting the level of the mercury in the U-tube 11. As the mercury rises in the opening 25 connected with the U-tube 11 it will, of course, short-circuit all of the metallic discs below the level of the mercury and thus cut out the resistance coils 30 connected with these discs. This will decrease the resistance in the electric circuit and cause a higher reading of the ammeter 35. The parts, of course, may be so proportioned and calibrated that the ammeter 35 will read temperatures directly in degrees if desired. The air within the tube 18 will, of course, follow the well-known law that pressure times volume is equal to a constant times the temperature. From this equation it is possible to compute the increment of the volume of air in the tube 18 for a given rise in temperature and the size of the opening 25 will be governed accordingly. It will be apparent, of course, that the line wires 32 and 33 may be carried to any convenient position so that the readings of the instrument 35 may be taken at convenient points entirely independent of the position of the tube 18.

In some cases it may be desirable to use a mercury bulb in lieu of the air tube 18, and in such cases the rise of the mercury in the opening 25 may be made to depend entirely upon the increase in volume of the mercury incident to rises in temperature. Such a construction is shown in Fig. 2 of the drawings in which the arrangement of the discs 21 and 22 is similar to that of the figure already described, as is also the arrangement of the resistances 30 and the electric apparatus associated therewith. The U-tube 10, however, and the air bulb 18 are replaced by a mercury bulb 37 connected with the base member 38 of the measuring instrument by a union 39. The interior of the bulb 37 is supplied with mercury and communicates directly with the opening 25 through the center of the discs 21 and 22. The base 38 is provided with a passageway 40 which is connected with the interior of the bulb 37 and which communicates with a standpipe or tube 41 extending upwardly from the upper face of the base member 38. The connection between the passageway 40 and the standpipe 41 is controlled by a valve 42 which may be opened to permit replenishing the mercury in the tube 37. The valve 42 is normally closed during the operation of the device. The tube 37 may be threaded directly into a pipe or chamber 43, the interior temperature of which it is desirable to register. The operation of this form of thermometer is similar to that of the form previously described, with the exception that the variation of the height of the mercury in the tube 25 depends directly upon the expansion of the mercury in the bulb 37 instead of expansion of air or gas in the gas bulb 18.

I claim:

In a temperature indicating device, a casing having a transverse partition therein, resistance elements in series with one another disposed in said casing at one side of said partition, a plurality of plates of conducting material arranged in said casing at the other side of said partition, said plates being superimposed upon one another but insulated from one another and having a registering opening extending therethrough, and conductors extending, one from each of said plates to points in said electric circuit between the resistance elements thereof.

In testimony whereof I have signed my name to this specification on this 11th day of March A. D. 1920.

JACOB M. SPITZGLASS.